May 19, 1931. J. M. STAUDE 1,806,028

TUBE WELDING FURNACE

Filed March 29, 1930 2 Sheets-Sheet 1

INVENTOR
John M. Staude
by
William B. Jaspert
Attorney

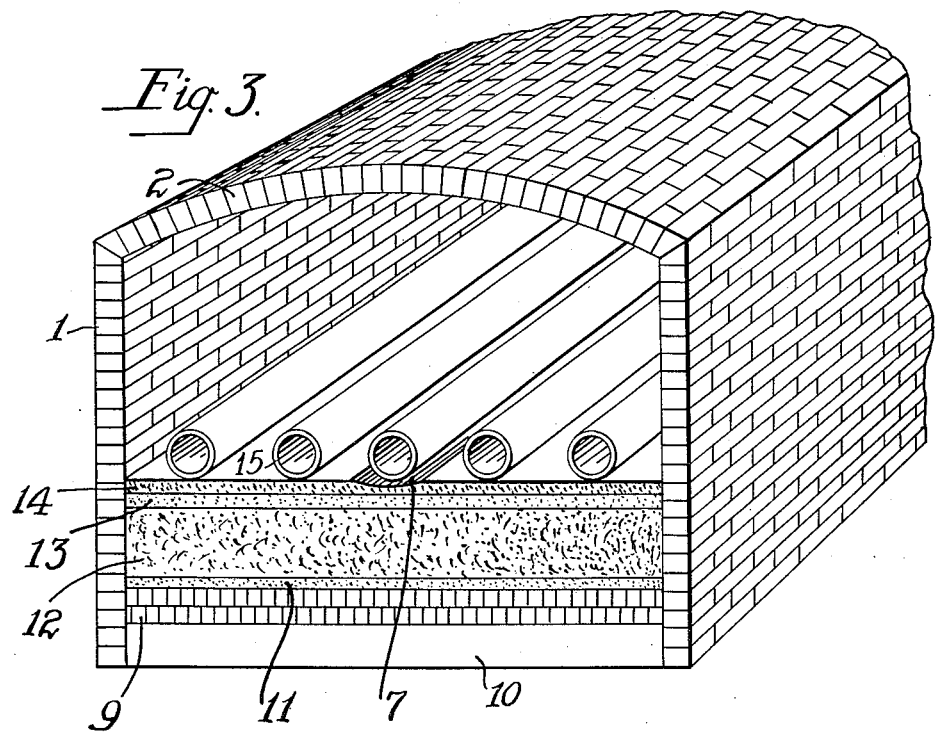
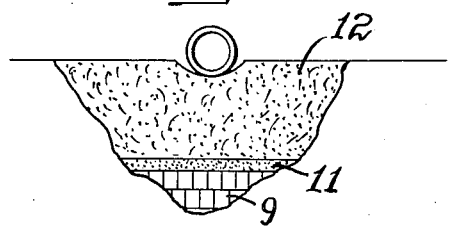
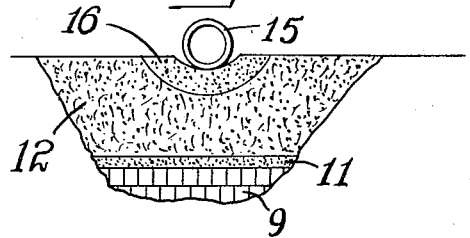

Patented May 19, 1931

1,806,028

UNITED STATES PATENT OFFICE

JOHN M. STAUDE, OF PITTSBURGH, PENNSYLVANIA, ASSIGNOR OF ONE-THIRD TO ADAM I. DUVAL AND ONE-THIRD TO CARL A. KNOTT, BOTH OF PITTSBURGH, PENNSYLVANIA

TUBE WELDING FURNACE

Application filed March 29, 1930. Serial No. 439,897.

This invention relates to pipe welding furnaces, more particularly to the construction of the bottom of such furnaces to render them more serviceable and less expensive in use.

Pipe welding furnaces as heretofore constructed, had the bottom thereof composed of silica brick overlaid with a certain depth of silica sand which had a covering of a mixture of broken china and silica sand. In furnaces of this type, the sand absorbed great heat and was productive of numerous difficulties in the handling of the pipe during the welding operation.

For example, one of the particular difficulties incurred was the forming of so-called "liquor marks" which were caused by the running of the sand, and "sand holes" and "cinder holes" so-called, that were caused by the heat of that type of furnace.

The china-silica-sand type of furnace bottom requires the bottom to be renewed at an average of eight times in twenty-four hours for medium sized pipe, and in the handling of smaller pipe the rebuilding periods are more frequent.

On account of the liquor marks and cinder holes, a large percentage of the welded pipe was defective and became scrap, thereby greatly increasing the cost of production of the pipe that passed inspection.

It is among the objects of the present invention to overcome the various difficulties referred to whereby the cost of maintaining the furnace and the cost of the finished product is materially reduced.

In accordance with the present invention, a basic non-corrodible lining is provided on the bottom of the furnace which may be built up in various ways by utilizing a combination of magnesite, dolomite and slag, powdered magnesite and slag and burned lime.

In basic open hearth practice, the bottom of the open hearth furnace is lined with dolomite so that the material is subjected to the action of the basic dolomite during the heat. On account of the very high temperatures in open hearth practice, the dolomite is melted into slag, and after each heat is tapped the dolomite bottom of the furnace has to be renewed.

In the application of basic dolomite to pipe welding furnaces, the dolomite or other basic materials are not subjected to such excessive temperatures and once they have been fused or slagged in the construction of the furnace in the manner to be hereinafter described, the dolomite need not be renewed for each heat as in open hearth practice nor need it be renewed as frequently as the silica type pipe welding furnace bottoms.

Figure 1:
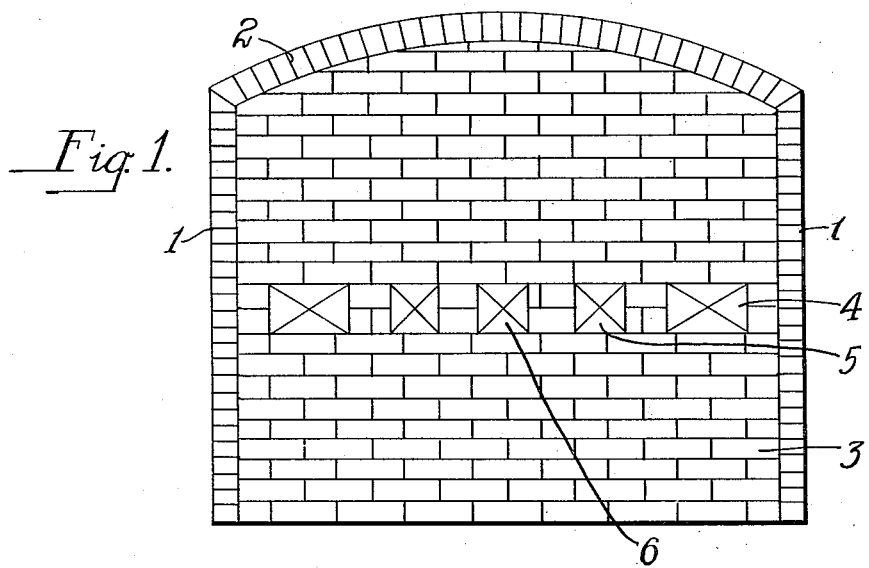
Figure 2:
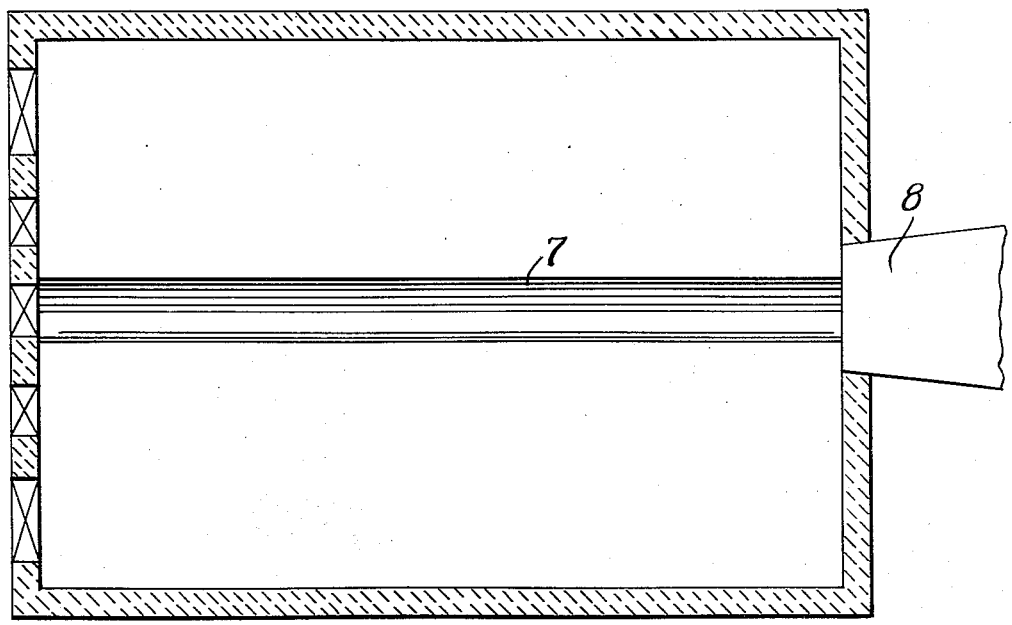

The objects and features of the invention will become more apparent from a consideration of the accompanying drawings in which like reference characters designate like parts and in which Fig. 1 is a front elevational view of a common form of pipe welding furnace; Fig. 2 a horizontal section showing the bottom of the furnace in elevation; Fig. 3 a rear elevational view of the furnace shown in Fig. 1; and Figs. 4 and 5 front elevational views of detail portions of the hearth bottom shown in Fig. 3.

With reference to the several figures of the drawing, the structure therein illustrated comprises side, top and end walls, 1, 2, and 3 respectively, formed of silica brick to constitute a heating chamber open at the rear end as shown in Fig. 3. The front wall 3 is provided with two doors 4, turn down openings 5 and a welder's look-in opening 6, the pipe being charged through the doors 4, turned down through the door 5 and placed in trough 7, Fig. 1, from which when raised to the pipe welding temperature, it is skidded into a pair of welding rolls located at the back of the furnace, as diagrammatically shown in Fig. 2 at 8.

With reference to Figs. 3 to 5 of the drawing, the furnace hearth or bottom is constructed of several layers of magnesite brick 9 which is luted with a suitable cement and this wall may be flat or of arch type. Below the magnesite brick 9 is provided a space 10 for the checkers and gas inlets and outlets. A layer 11 of powdered magnesite and slag is provided on the magnesite brick 9 this being put on by spreading the magnesite and slag on the brick which may be previously heated and then subjecting the spread material to a fusing temperature.

On top of the layer 11 a relatively thick layer 12 of dolomite and slag is provided and this is also fused. On account of the shrinkage of the dolomite and slag when subjected to a fusing temperature, the relatively thick layer 12 is built up of small layers each of which is separately fused until a layer of sufficient thickness has been produced. This layer of dolomite and slag may form the hearth or bottom of the pipe welding furnace as shown in the detail of Fig. 4, but it may be desired, depending upon the size of the pipe and the temperatures employed, to add additional layers of basic materials such as a layer 13 of powdered magnesite and slag, which is fused after spreading on the layer 12 of dolomite, and the final layer 14 of burned lime may be utilized as a hearth for the pipe 15 to be welded.

In the modification shown in Fig. 5, a hearth bottom of dolomite and slag is employed but a trough 16 of powdered magnesite and slag is formed in the center of the hearth to withstand the rough usage to which it is subjected when the pipe 15 is pushed out of the furnace.

As shown in Fig. 3, the central pipe in the trough 7 is in discharge position for welding and the pipes adjacent the trough are those which are next ready to be rolled or turned down into the trough 7. The pipe is charged through the openings 4 adjacent the walls 1 and are alternately turned down toward the center from which they are finally discharge to the welding rolls, this being standard practice in tube welding operations.

The depth of the layers 11, 12, 13 and 14 can be readily determined by practice and the proper choice of material can readily be made to meet the operating conditions such as temperature, size of pipe, etc. The essential feature of the invention is the use of a basic hearth which once having been fused, will stand up under the relatively low temperatures of the pipe welding furnace so that it will not require frequent renewal as in the use of china and silica sand furnace bottoms.

Magnesite brick is employed in the hearth structure as it has greater heat resisting qualities than the silica brick which latter may, however, be employed in the side walls and roof structure.

After the furnace bottom has been constructed in the manner described, it is preferable to grind the final or top layer of the dolomite and slag to give the bottom a smooth and lasting surface.

The basic bottom, as herein explained, eliminates sand holes, cinder holes and liquor marks thus reducing the amount of defective pipe and a further saving is effected in that the necessity for rebuilding the bottom at frequent intervals is reduced. Also, the dolomite and slag compositions herein proposed are far less expensive than the broken china mixture with the silica sand as utilized in present day practice.

It will be evident from the foregoing description of this invention that basic dolomite and slag bottoms for pipe welding furnaces eliminate the difficulties encountered in prior art furnaces and increases the capacity of such furnaces by reducing the time lost in their reconstruction.

Although one embodiment of the invention has been herein illustrated and described, it will be obvious to those skilled in the art that various modifications may be made in the details of construction without departing from the principles herein set forth.

I claim:

1. A heating furnace comprising side, top and end walls, forming a heating chamber, and a bottom formed of a plurality of layers of fused magnesite and slag and dolomite and slag.

2. A heating furnace bottom comprising a supporting structure of brick having a thin layer of fused powdered magnesite and slag, a relatively thick layer of dolomite and slag and a layer of fused magnesite and slag in superposed relation.

3. A heating furnace bottom comprising a supporting structure of brick having a thin layer of fused powdered magnesite and slag, a relatively thin layer of dolomite and slag and a layer of fused magnesite and slag, and a final or top layer of burned lime in superposed relation.

In testimony whereof I have hereunto set my hand this 28th day of March, 1930.

JOHN M. STAUDE.